United States Patent [19]
Inoue et al.

[11] Patent Number: 6,088,546
[45] Date of Patent: *Jul. 11, 2000

[54] IMAGE FORMING APPARATUS WITH GLOSSINESS DETECTION

[75] Inventors: Masahiro Inoue, Yokohama; Yuji Sakemi, Inagi; Rie Saito, Yokohama; Jiro Ishizuka, Chiba; Mitsuhiro Ota, Yokohama, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/582,143

[22] Filed: Jan. 2, 1996

[30] Foreign Application Priority Data

Jan. 23, 1995 [JP] Japan ................................ 7-008358

[51] Int. Cl.⁷ .................................................. G03G 15/00
[52] U.S. Cl. .............................. 399/45; 399/67; 399/69; 399/324
[58] Field of Search ................. 399/45, 67, 69, 399/320, 324, 325; 358/296

[56] References Cited

U.S. PATENT DOCUMENTS

| | | | |
|---|---|---|---|
| 4,905,036 | 2/1990 | Asano et al. | 355/401 |
| 5,045,698 | 9/1991 | Kurashima | 250/327.2 |
| 5,162,860 | 11/1992 | Nami et al. | 358/501 |
| 5,260,753 | 11/1993 | Haneda et al. | 399/54 |
| 5,463,457 | 10/1995 | Takeuchi et al. | 399/325 X |
| 5,581,339 | 12/1996 | Jamzadeh et al. | 399/320 |
| 5,751,432 | 5/1998 | Gwaltney | 358/296 |

FOREIGN PATENT DOCUMENTS

| | | |
|---|---|---|
| 62-209578 | 9/1987 | Japan . |
| 2-203342 | 1/1989 | Japan . |
| 3-262262 | 11/1991 | Japan . |
| 4-104151 | 4/1992 | Japan . |
| 5-188813 | 7/1993 | Japan . |
| 5-313537 | 11/1993 | Japan . |

OTHER PUBLICATIONS

European Search Report.

*Primary Examiner*—William J. Royer
*Attorney, Agent, or Firm*—Fitzpatrick, Cella, Harper & Scinto

[57] ABSTRACT

An image forming apparatus has an image forming device for forming an image on a recording material in response to an image on a document. The apparatus also has a glossiness detection device for detecting from the document the level of glossiness of the document image. The image forming device is controlled based on an output from the glossiness detection device. With this construction, the level of glossiness in response to the document image can be reproduced on the recording material, thus improving the quality of reproduced images.

23 Claims, 15 Drawing Sheets

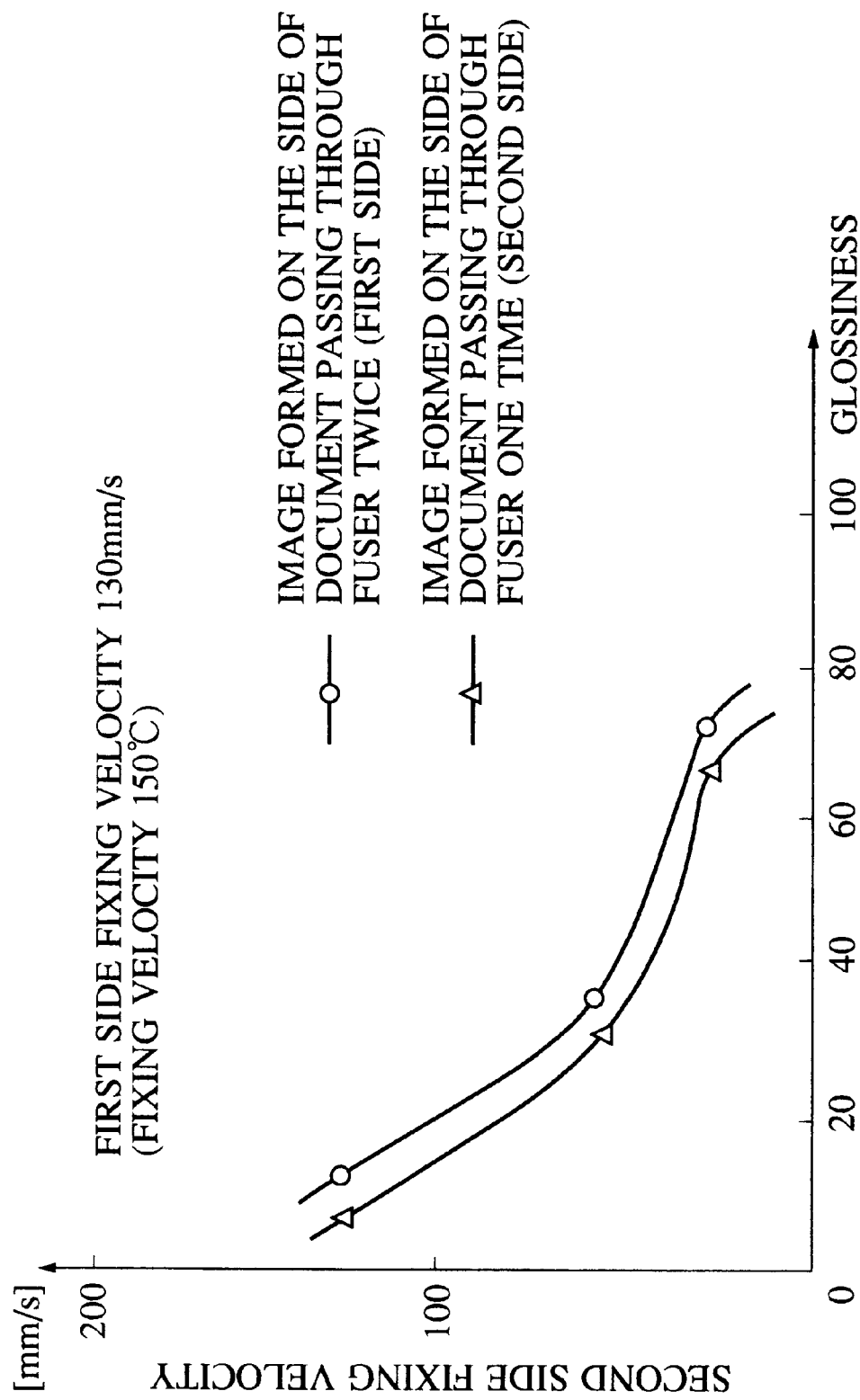

RELATIONSHIP BETWEEN DOCUMENT GLOSSINESS AND FIXING VELOCITY

IMAGE FORMING APPARATUS WITH GLOSSINESS DETECTION

BACKGROUND OF THE INVENTION

1. Field of the Invention

The present invention relates to an image forming apparatus, such as a copying machine, a laser beam printer and so on.

1. Description of the Related Art

Laser printers utilizing the so-called "electrophotographic method" are known as image forming apparatuses. In this method, a photosensitive member is first charged, and then an image is exposed to laser light and developed. Laser printers, having the advantages of providing quality images and performing fast printing operations, are widely used.

The conventional image forming method will now be explained with reference to FIGS. 10 through 12. FIG. 10 is a schematic view of the construction of an image reader for use in color image processing means. The document reading process will now be explained with reference to FIG. 10. A copy key (not shown) of an operational unit is pressed so as to cause a light source 103 to apply light to an original document 101. The light reflected from the document 101 passes through an image forming element array 104 and an infrared-ray cut filter 105 so as to form the document image on a CCD (contact-type CCD color sensor) 106. An optical unit 107 sequentially scans the document 101 placed on a platen 102 while moving in the direction indicated by the arrow shown in FIG. 10 (to the right-hand side of FIG. 10).

As illustrated in FIG. 11, color filters, such as red (R), green (G) and blue (B) filters, corresponding to the respective pixels, are regularly mounted on the CCD 106. Simultaneously with the scanning operation performed on the document 101, electric signals from the CCD 106 are processed by a signal processing circuit 110 shown in FIG. 12.

6B, 6G and 6R shown in FIG. 12 represent signals transmitted from the B, G and R elements mounted on the CCD 106 illustrated in FIG. 11. The B, G and R signals are introduced to an A/D conversion circuit 111 and a density conversion circuit 112 where they are converted to $Y_1$, $M_1$ and $C_1$ digital signals. These signals are further supplied to a circuit 113 for performing black-color extraction and under color removal (UCR) processing where $Y_2$, $M_2$, $C_2$ and $Bk_2$ signals are generated according to the computation processing expressed by the following equations:

$$Y_2 = Y_1 - k_3 \min(Y_1, M_1, C_1)$$

$$M_2 = M_1 - k_3 \min(Y_1, M_1, C_1)$$

$$C_2 = C_1 - k_3 \min(Y_1, M_1, C_1)$$

$$Bk_2 = K_1 \min(Y_1, M_1, C_1) + k_2$$

wherein $\min(Y_1, M_1, C_1)$ denotes the minimum signal among $Y_1$, $M_1$, $C_1$ signals; and $k_1$, $k_2$ and $k_3$ indicate predetermined coefficients. Subsequently, the $Y_1$, $M_1$, $C_1$ and $Bk_2$ signals are supplied to a color correction circuit 114 for correcting the spectral distribution of a coloring material used by the color separation filters on the CCD 106 and by the image forming means and are subjected to the computation processing expressed by the following mathematical equations (1):

$$\begin{bmatrix} Y_3 \\ M_3 \\ C_3 \\ Bk_3 \end{bmatrix} = \begin{bmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{bmatrix} \begin{bmatrix} Y_2 \\ M_2 \\ C_2 \\ Bk_2 \end{bmatrix}$$

wherein $a_{11}$ to $a_{44}$ designate masking coefficients for the color correction. As a result of the above-mentioned computation processing, the $Y_3$, $M_3$, $C_3$ and $Bk_3$ signals can be visualized by color image forming means (printer) 200, such as a color thermal transfer printer, a color ink jet printer, a color laser printer, etc.

In this manner, according to the conventional technique, the image density and color information on the document image are first read, and the printer is controlled so that the above-mentioned image information can be output as accurately as possible. With this arrangement, good reproducibility of the document image can be enhanced as faithfully as possible, thus achieving high quality of the reproduced images.

There is an increasing demand for even higher reproducibility, more faithful to the document. More specifically, it is highly demanded that the level of glossiness (for example, defined by JIS Z8105-4003, Z8741, P8142 and so on), as well as the image density and color, be reproduced as faithfully as possible from an original document. Conventionally, however, the user sets the degree of glossiness, and also, the number of setting levels of glossiness is very limited, thus making it impossible to achieve accurate reproduction of the level of glossiness in response to the document image.

SUMMARY OF THE INVENTION

Accordingly, it is an object of the present invention to provide an image forming apparatus which is capable of reproducing the level of glossiness in accordance with an image formed on an original document.

Another object of the present invention is to provide an image forming apparatus comprising image forming means for forming an image on a recording material according to a document image, glossiness detection means for detecting from the document the level of glossiness of the document image, and control means for controlling the image forming means based on an output from the glossiness detection means.

A further object of the present invention is to provide an image forming apparatus comprising image forming means for forming and fixing an unfixed image on a recording material in accordance with a first image on a document and then for forming and fixing an unfixed image on the recording material in accordance with a second image on the document, and glossiness detection means for detecting from the document the level of glossiness of the document image, wherein the level of glossiness of the first document image obtained from the glossiness detection means is higher than the level of glossiness of the second document image.

Further objects, features and advantages of the present invention will become apparent from the following description of the preferred embodiments with reference to the attached drawings.

BRIEF DESCRIPTION OF THE DRAWINGS

FIGS. 14(a) and 14(b) illustrate the relationship between the level of glossiness of the document and the fixing velocity of the second side of the recording material.

DETAILED DESCRIPTION OF THE PREFERRED EMBODIMENTS

Figure 1:
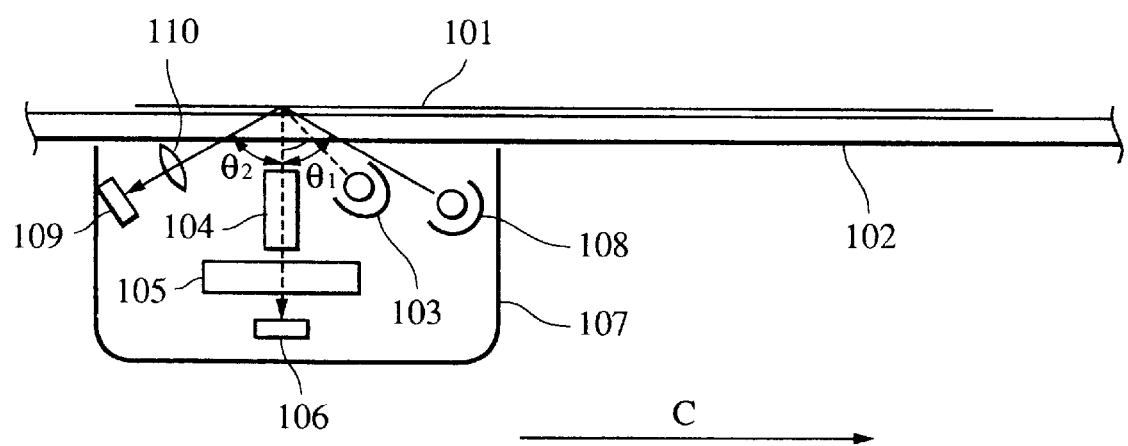
FIG. 1 is a sectional view of the construction of an image reader according to an embodiment of the present invention.

FIG. 1 is a schematic view of the construction of an original-document reader (image reader) for use in an image forming apparatus utilizing an electrophotographic method according to an embodiment of the present invention. The document reading process will now be explained with reference to FIG. 1.

Upon pressing a copy key (not shown) of an operational unit, a pre-scanning process, which is a preliminary process for image formation, is started. More specifically, light sources 103 and 108 apply light onto a document 101 placed on a platen 102. The light emitted from the light source 103 and reflected from the document 101 passes through an image-forming element array 104 and an infrared-ray cut filter 105 and reaches a CCD (contact-type color sensor CCD) 106, thus forming an image.

Meanwhile, the light emitted from the light source 108 and reflected from the document 101 passes through a condenser lens 110 and reaches a photoreceiver 109. An optical unit 107 sequentially scans the document 101 placed on the platen 102 while moving in the direction indicated by the arrow C shown in FIG. 1.

The photoreceiver 109 is located to receive the light emitted from the light source 108 and regularly reflected from the document 101. In other words, the angle $\theta_1$ of incident light travelling from the light source 108 to the document 101 is equal to the angle $\theta_2$ of the reflected light travelling from the document 101 to the photoreceiver 109.

Based on the image information read by the CCD 106, the document size, the optimal quantity of light to be applied to the document and other conditions are computed and determined. Also, on the basis of the image information read by the photoreceiver 109, the following computation processing is executed according to a controller (processing circuit) 100 shown in FIG. 2. The reflected light is converted to glossiness (glossy value) in a glossiness conversion circuit 120, and the maximum glossiness within the whole picture of the document 101 is computed in a maximum glossiness computation circuit 121. In accordance with this maximum glossiness, the value for correcting the fixing conditions is determined in a fixing condition correction circuit 122 subsequent to the maximum glossiness computation circuit 121 and is supplied to a printer 200.

Figure 2:
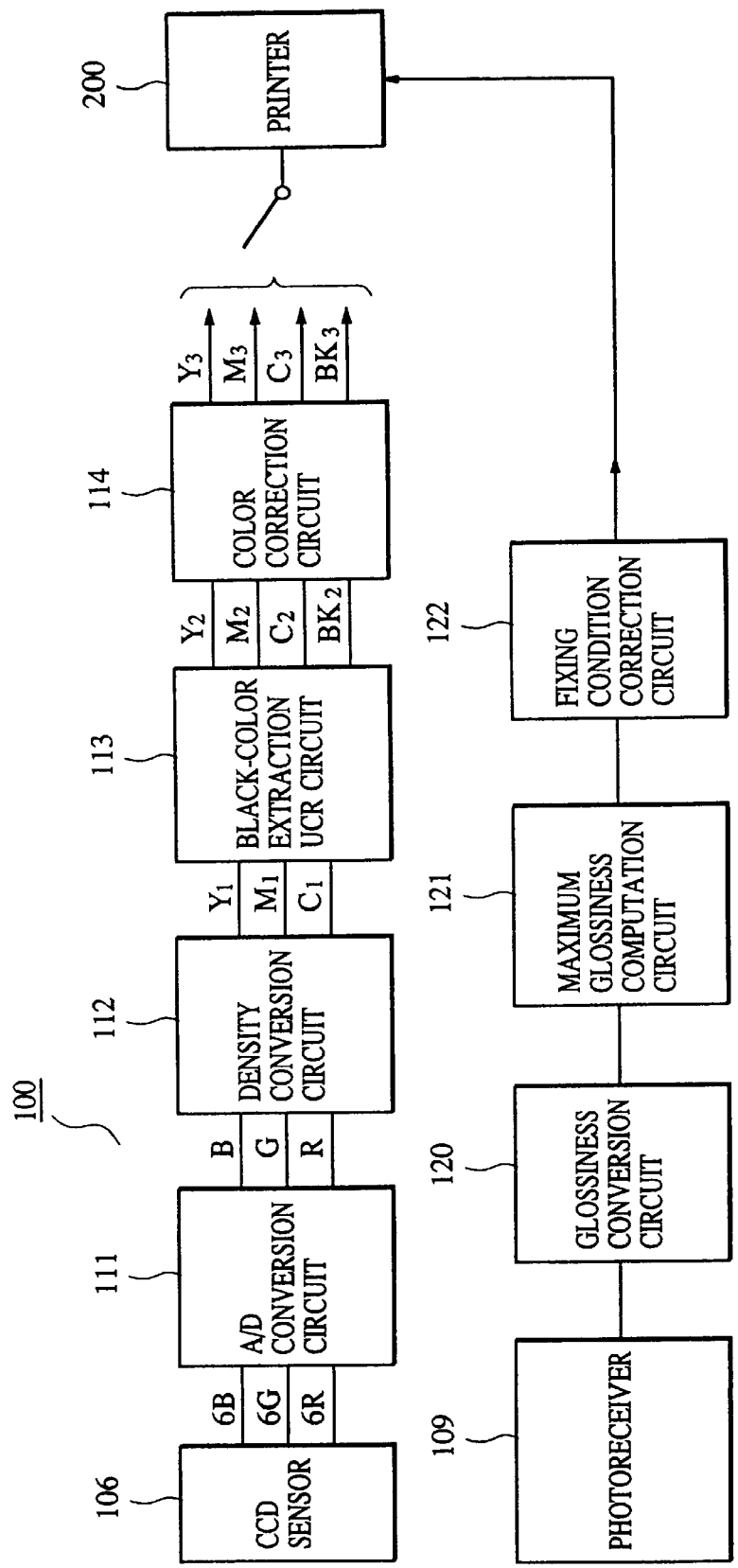
FIG. 2 is a block diagram of the document image information processing circuitry.

In a subsequent image-forming process, according to the process shown in FIG. 2, the light emitted from the light source 103 and reflected from the document image 101 in the manner described above is computed and converted to chrominance signals ($Y_3$, $M_3$, $C_3$ and $Bk_3$), which are then supplied to the printer 200, thus forming a visualized image (toner image) on the recording material.

Figure 3:
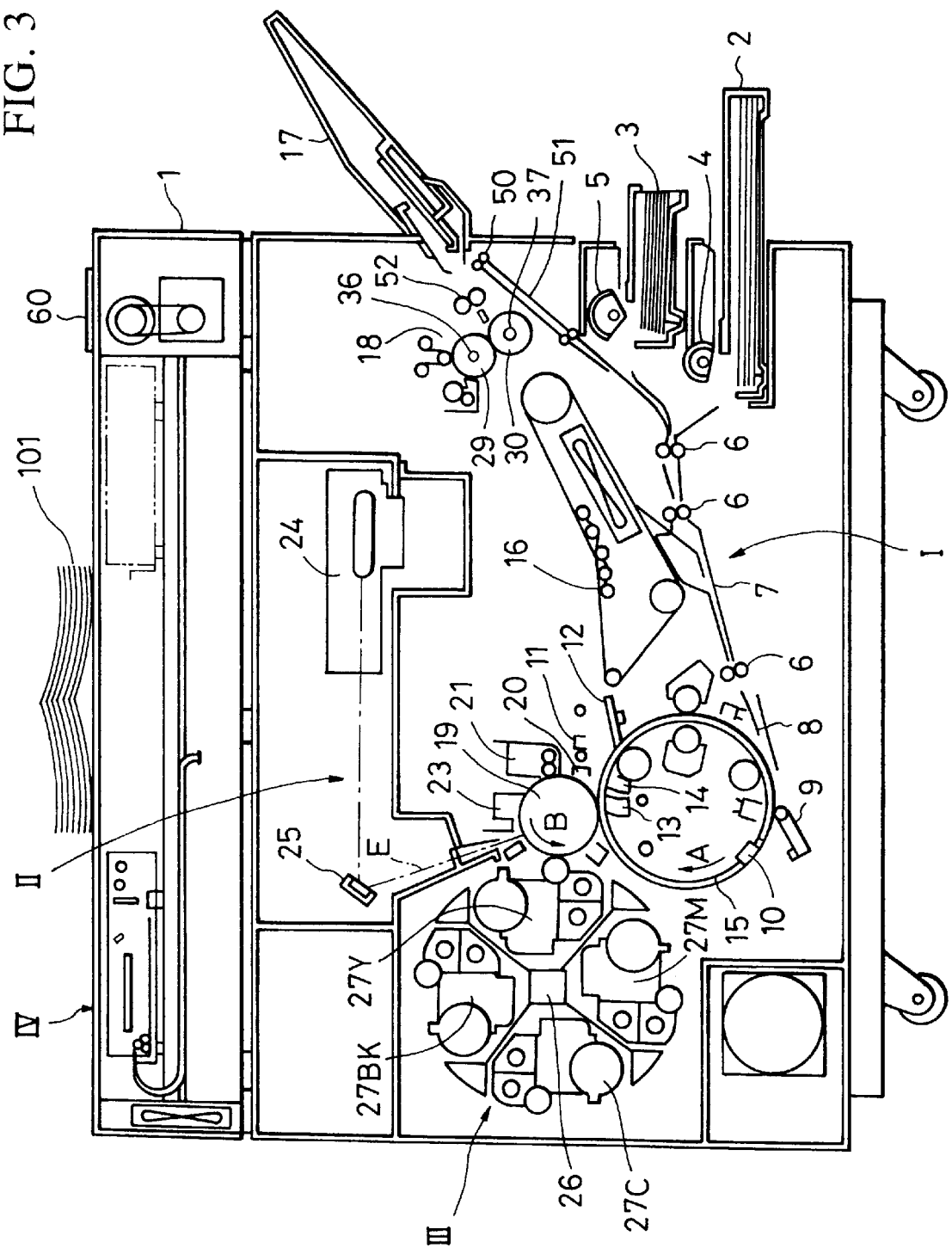
FIG. 3 is a sectional view of the construction of an image forming apparatus according to an embodiment of the present invention.

The printer can be represented by a color electrophotographic apparatus illustrated in FIG. 3 by way of example. The color electrophotograhic apparatus shown in FIG. 3 has a document reading system (unit) generally denoted by IV on the upper portion thereof. Also, the apparatus is largely divided into a recording material feeding system I, a latent-image forming system II, and developing means, i.e., a rotary developer unit system III, provided in the proximity to the latent-image forming system II. The recording material feeding system I is disposed in an area from the right portion to the central portion of an image forming apparatus main unit (hereinafter simply referred to as "the apparatus unit") 1. The latent-image forming system II is located in the vicinity of a transfer drum 15 that constitutes the recording material feeding system I.

The recording material feeding system I is constructed as follows. The apparatus unit 1 has an opening on its right wall in which trays 2 and 3 for supplying the recording materials are detachably attached, partially projecting outside. Recording-material feeding rollers 4 and 5 are disposed substantially right above the trays 2 and 3, respectively. Recording-material feeding rollers 6 and recording-material feeding guides 7 and 8 are provided so that the recording-material feeding rollers 4 and 5 can be communicated with the transfer drum 15 (transfer means) that is located on the left side of the rollers 4 and 5 and is rotatable in the direction indicated by A in FIG. 3. In the vicinity of the outer peripheral surface of the transfer drum 15, a transfer drum-abutting roller 9, a gripper 10, a charger 11 for separating the recording material and a separating claw 12 are sequentially disposed from upstream to downstream in the rotating direction. On the other hand, a charger 13 for transferring the recording material and a charger 14 for separating the material are provided on the inner peripheral surface of the transfer drum 15. The transfer drum 15 is partially coated with a transfer sheet (not shown) formed of polyvinylidene or the like, in the portion of the drum 15 around which a recording material is wound, whereby the recording material can be electrostatically brought into intimate contact with the transfer sheet. Feeding belt 16 is provided in proximity to the separating claw 12 and on the upper right portion of the transfer drum 15. Further, a fuser 18 is disposed at the final (right) end of the feeding belt 16 in the feeding direction of the recording material. A recording-material discharging tray 17 is located further downstream of the fuser 18 in the recording-material feeding direction in such a manner that it extends to the exterior of the apparatus unit 1 and is detachably attached to the unit 1.

The construction of the latent-image forming system II will now be explained. The outer peripheral surface of a photosensitive drum 19, rotatable in the direction indicated by the arrow B in FIG. 3, which is a latent image carrier, is brought into contact with the outer peripheral surface of the transfer drum 15. Above and close to the outer peripheral surface of the photosensitive drum 19, a charger 20 used for performing charge removal, cleaning means 21 and a primary charger 23 are sequentially disposed from upstream to downstream in the rotating direction of the photosensitive drum 19. Moreover, provided on the outer peripheral surface of the photosensitive drum 19 are image exposure means 24, such as a laser beam scanner or the like, used for forming electrostatic latent images, and image exposure reflecting means 25, such as a mirror or the like.

Finally, a description will be given of the construction of the rotary developer unit system III. A rotatable casing (hereinafter referred to as "the rotary member") 26 is disposed in a position in which it opposedly faces the outer peripheral surface of the photosensitive drum 19. Four types of developer units are circumferentially loaded within the rotary member 26 so that they can visualize (develop) a latent image formed on the outer peripheral surface of the photosensitive drum 19. The four types of developer units are a yellow developer unit 27Y, a magenta developer unit 27M, a cyan developer unit 27C and a black developer unit 27Bk.

A brief explanation will now be given of the overall sequence of the image forming apparatus constructed as described above operated in a full color mode, by way of example. The above-noted photosensitive drum 19 is rotated in the direction indicated by the arrow B in FIG. 3 so as to allow the photosensitive member placed on the photosensitive drum 19 to be uniformly charged by the primary charger 23. It should be noted that the operating velocity (hereinafter referred to as "the process velocity") of the respective elements of the image forming apparatus illustrated in FIG. 3 is 160 mm/second. The photosensitive drum 19 is uniformly charged by the primary charger 23 as described above, and then an image formed on the document 101 is exposed to the laser beam E, modulated according to a yellow image signal of the document 101, whereby an electrostatic latent image is formed on the photosensitive drum 19 and is developed by the yellow developer unit 27Y that has been located in a predetermined developing position by the rotation of the rotary member 26.

Meanwhile, the recording material, supplied from the tray and passing through the recording-material, feeding guide 7, the recording-material feeding rollers 6 and the recording-material feeding guide 8, is held by the gripper 10 at a predetermined timing and is electrostatically wound around the transfer drum 15 by the abutting roller 9 and an electrode, both of which opposedly face each other. The transfer drum 15 is rotated in the direction indicated by the arrow A in synchronization with the photosensitive drum 19. The visualized image (toner image) developed by the yellow developer unit 27Y is transferred by the transfer charger 13 in a position where the outer peripheral surfaces of the photosensitive drum 19 and the transfer drum 15 contact with each other. The transfer drum 15 continues to rotate and is stationed for a subsequent transfer operation by a different developer unit for a different color (magenta in FIG. 3).

In the meantime, the photosensitive drum 19 has its charge removed by the above-described charge-removal charger 20 and is cleaned by the cleaning means 21 according to a known blade method. Subsequently, the drum 19 is once again charged by the primary charger 23, and the previously-discussed image exposure is performed according to a subsequent magenta image signal. During the formation of a latent image on the photosensitive drum 19 by exposing the image according to the magenta signal, the rotary developer unit system III is rotated to locate the magenta developer unit 27M in the predetermined position to permit it to perform a predetermined magenta developing operation. Similarly, the above-described process is repeated for transferring the cyan color and the black color to complete the transfer operation for the four colors. Thereafter, the four-colored toner image formed on the recording material 101 has its charge removed by the respective chargers 20 and 14. The recording material 101 is released from the gripper 10 and is also separated from the transfer drum 15 by means of the separating claw 12. The material 101 is further fed to the fuser 18 by the feeding belt 16 and is fixed by way of heat and pressure, thereby completing a series of the full color print sequence. A desired full color print image is thus formed.

In the manner described above, the color image is formed of two to four layers of multicolor toners. Accordingly, the electrophotographic apparatus for forming color images differs from the electrophotographic apparatus for forming black and white images in the following two features.

The first feature is concerned with the toner used in this apparatus. Since this toner is required to have good melting characteristics and good color mixture characteristics when heated, a sharp melt-type toner having a low softening point and low melt viscosity is used. This is also because the use of the sharp melt-type toner makes it possible to extend the color reproducible range of a material to be copied, thereby obtaining a color copy faithful to a multi-color or full-color image formed on a document.

The sharp melt-type toner is formed of a binding resin, such as a polyester resin or a styrene-acrylic ester resin, a colorant (a sublimating dye), a charge-controlling agent, and so on. Such toner-forming materials are melted and kneaded, and then, pulverized and classified, thus producing the sharp melt-type toner. If required, a further process may be provided to add various types of additives (for example, hydrophobic colloidal silica) to the toner-forming materials. As this type of color toner, a toner using a polyester resin as a binding resin is particularly preferable in consideration of fixing properties and sharp melt characteristics. The polyester resin provided with sharp melt-characteristics is represented by, for example, a polymeric compound containing ester linkages in the main chain that is synthesized by a diol compound and dicarboxylic acid. The following type of polyester resin expressed by the following chemical formula is particularly preferable since it exhibits sharp melting characteristics.

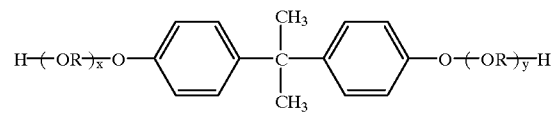

wherein R is an ethylene or propylene group; x and y are positive integers greater than 1; and the average sum of x and y is from 2 to 10. A bisphenol or substituted bisphenol derivative is used as a diol component. Polyvalent carboxylic acid, acid anhydride thereof, or lower alkyl ester thereof, is used as a carboxylic acid component (for example, fumar acid, maleic acid, maleic anhydride, phthalic acid, trimellitic acid, pyromellitic acid and so on). The above-mentioned diol component and the carboxylic acid component are at least co-condensation polymerized to obtain the above-described type of polyester resin.

The softening point of the polyester resin is preferably in a range from 75 to 150° C., and more preferably, from 80 to 120° C.

Figure 4:
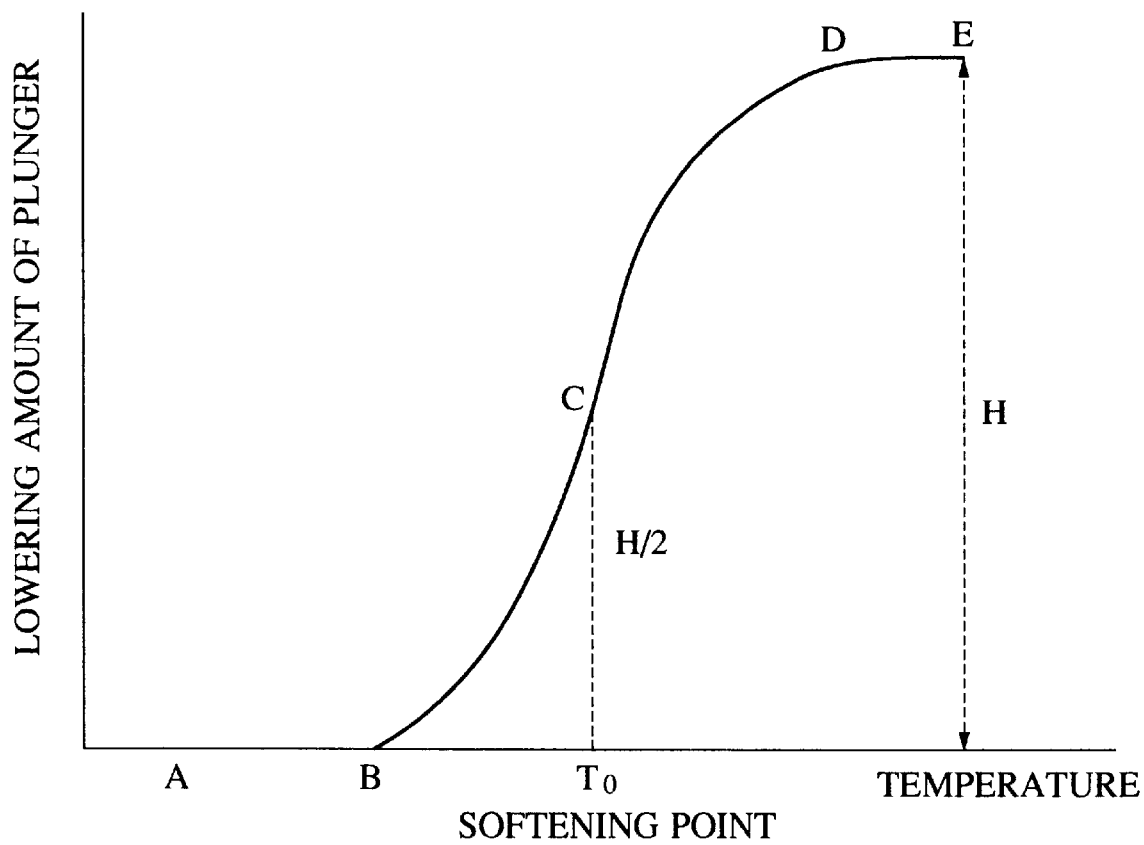
FIG. 4 is a graph that demonstrates the softening characteristics of sharp melt-type toner by illustrating the relationship between its temperature and the lowering of a plunger in a test setup described below.

FIG. 4 shows an example of softening characteristics of a sharp melt-type toner containing the above-discussed polyester resin as a binding resin. The measurement conditions are as follows.

The flow tester CFT-500 A type (manufactured by Shimadzu Corporation) was used. An extrusion load of 20 kg was applied through a plunger to the toner contained in a dye (nozzle) having a diameter of 0.2 mm and a thickness of 1.0 mm. The temperature of the toner was raised from the initial setting temperature of 70° C. at a constant rate of 6° C./minute after being preheated for 300 seconds. Under these conditions, a curve representing the amount the plunger was lowered versus temperature (hereinafter referred to as the "S-shaped softening curve") was obtained. 1 g to 3 g of the precisely-weighed fine powder was used as a specimen of toner. The sectional area of the plunger was 1.0 cm$^2$. The above-described S-shaped softening curve can be indicated as shown in FIG. 4 in which the toner is gradually heated to start to flow out with the increased temperature at a constant rate (the height of the plunger was lowered: from the point A to the point B). With the further increased temperature, the melted toner commences to sharply flow out (the height of the plunger was lowered: through points B, C and D), and the plunger finally stops lowering, accomplishing the operation (the height of the plunger was lowered: from the point D to the point E).

The height H of the S-shaped softening curve indicates that the total amount of toner flowed out. The temperature $T_O$ corresponding to the point C, indicating one half of the height H, represents the softening point of the toner.

Whether or not the toner and the binding resin exhibits sharp melt characteristics can be determined by measuring the apparent melt viscosity of the toner or the binding resin. The toner or the binding resin having sharp melt characteristics should satisfy the following conditions when the temperature at which the apparent melt viscosity is $10^3$ poise is indicated by $T_1$ and when the temperature at which the apparent melt viscosity is $4 \times 10^2$ poise is represented by $T_2$.

$T_1$,=90 to 150° C.

$|\Delta T|=|T_1,-T_2|=5$ to 20° C.

The sharp melt-type resins exhibiting the above-mentioned temperature versus melt viscosity characteristics are characterized in that the melt viscosity of the resin is sharply dropped when heated. Such a sharp viscosity drop induces a suitable mixture of the uppermost toner layer with the lowermost toner layer, and also significantly increases the transparency of the toner layer itself so as to bring about good subtractive color mixing.

The above-described sharp melt-type color toner has a high level of affinity and is disadvantageously inclined to be offset or transferred to a fixing roller. Accordingly, it is necessary for a fuser for use in an image forming apparatus utilizing the above-described type of toner to exhibit a higher level of releasability for a long period.

Figure 5:
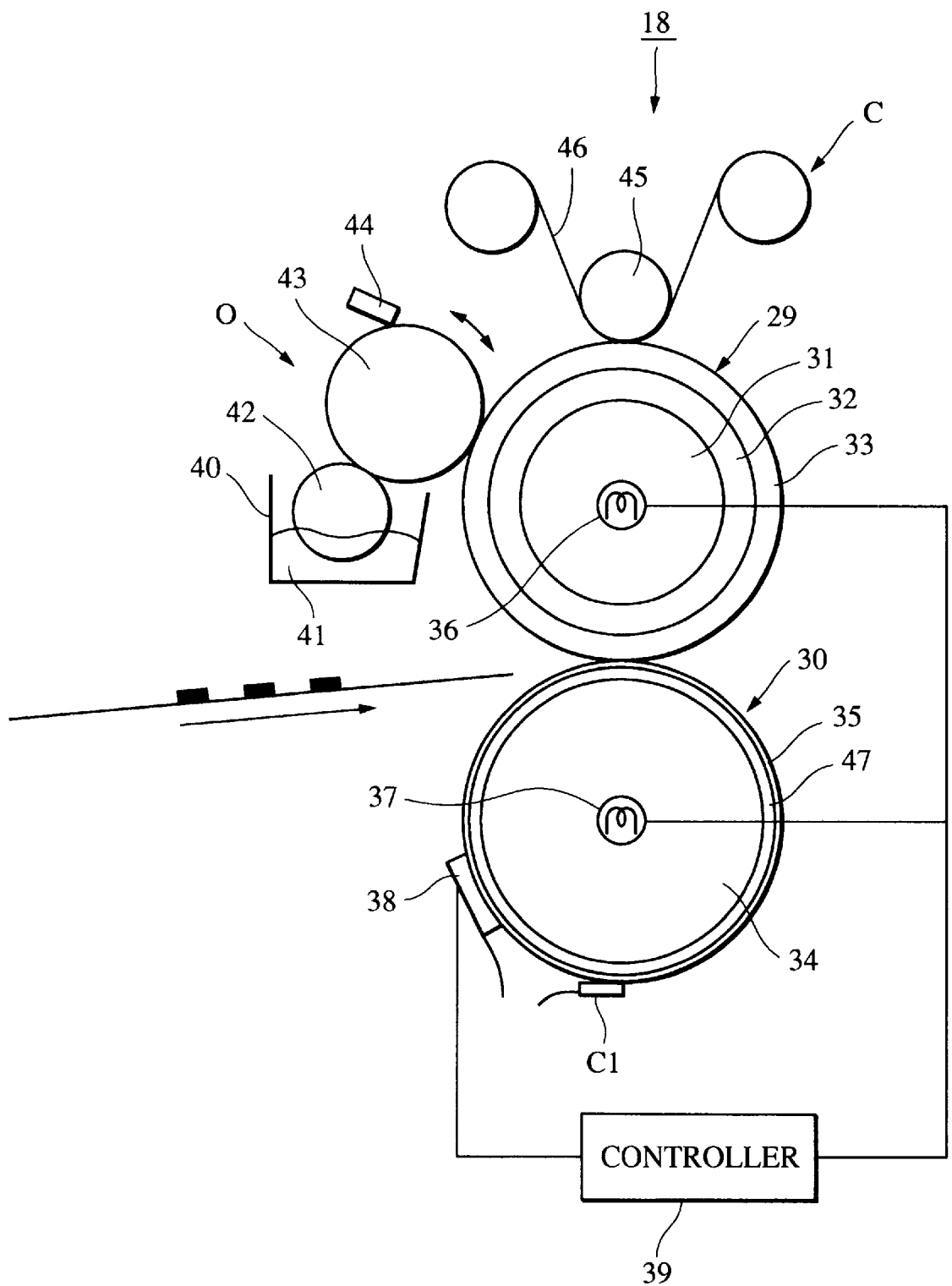
FIG. 5 is a sectional view of the construction of a fuser according an embodiment of the present invention.

FIG. 5 illustrates the fuser 18 for use in the color image-forming electrophotographic apparatus. In FIG. 5, a fixing roller 29 used as fixing means is formed to the size of 3 mm thick and 40 mm diameter and comprises a high-temperature vulcanized (HTV) silicone rubber layer 32 disposed around an aluminum metal core 31 and a room-temperature vulcanized (RTV) silicone rubber layer 33 located around the layer 32. On the other hand, a pressurizing roller 30 serving as pressurizing means is formed 40 mm in diameter and comprises an HTV silicone rubber layer 47 having a thickness of 1 mm provided around an aluminum metal core 34 and a fluororesin layer 35 disposed on the surface of the layer 47.

A halogen heater 36 serving as heating means is provided for the fixing roller 29, while another halogen heater 37 is located within the metal core 34 of the pressurizing roller 30, whereby a recording material can be heated from both sides. The temperature of the pressurizing roller 30 is detected by a thermistor 38 which is in contact with the pressurizing roller 30. Based on this temperature, the halogen heaters 36 and 37 are controlled by a controller 39. As a consequence, the temperatures of both the fixing roller 29 and the pressurizing roller 30 are maintained at approximately 150° C. It should be noted that a total pressure of approximately 40 kg is applied to the fixing roller 29 and the pressurizing roller 30 by a pressurizing mechanism (not shown).

Referring to FIG. 5, O indicates an oil applying device serving as releasing-agent applying means, C denotes a cleaning device, and Cl designates a cleaning blade for removing oil and dirt from the pressurizing roller 30. The oil applying device O permits dimethyl silicone oil 41 (trade name KF96 300 cs, produced by Shin-Etsu Chemical Co., Ltd.) stored in an oil pan 40 to pass through an oil lifting roller 42 and an oil applying roller 43 and controls the applying amount of oil by means of an oil applying amount adjusting blade 44, thus applying the oil 41 onto the fixing roller 29. In the apparatus shown in FIG. 5, 0.08 g/A4 of oil is applied to the roller 29 according to the below-mentioned measurement method. It should be noted that the oil applying roller 43 can be attached to and separated from the fixing roller 29, whereby the roller 43 applies oil to the recording material in a range from a position 5 mm inward from the forward end of the material to a position 5 mm inward from the rear end thereof.

The amount of silicone oil to be applied by the oil applying device O can be determined as follows. It will now be assumed that fifty A4-size white sheets of paper weigh $A_1$ (g), and the sheets of paper after passing between the fixing roller 29 and the pressurizing roller 30 without transferring an image to the sheets nor without applying silicone oil to the rubber layer 32 of the fixing roller 29 weigh B (g). Similarly, it will further be assumed that another type of fifty A4-size white sheets of paper weigh $A_2$ (g) and the sheets of paper after passing between the fixing roller 29 and the pressurizing roller 30 with the application of silicone oil to the rubber layer 32 of the fixing roller 29 but without transferring an image to the sheets weigh C (g). According to the above-mentioned weights $A_1$, B, $A_2$ and C, the amount of oil X (g) to be applied to each sheet can be obtained by the following equation:

$$X=(C+A_1,-B-A_2)/50$$

The cleaning device C for use in the fuser 18 shown in FIG. 5 cleans the fixing roller 29 by pressing a non-woven web 46 formed of Nomex (produced by Du Pont) against the fixing roller 29 with the use of a pressurizing roller 45. The web 46 is wound around a take-up device (not shown) as required not to allow toner to accumulate on the web 46 when coming contact with each other.

Moreover, this embodiment is constructed in such a manner that fixing velocity variable means is provided to change the fixing velocity based on the fixing condition correction value attained in the document reading system IV, which value can be then reflected on the previously-discussed fuser 18.

Figure 6:
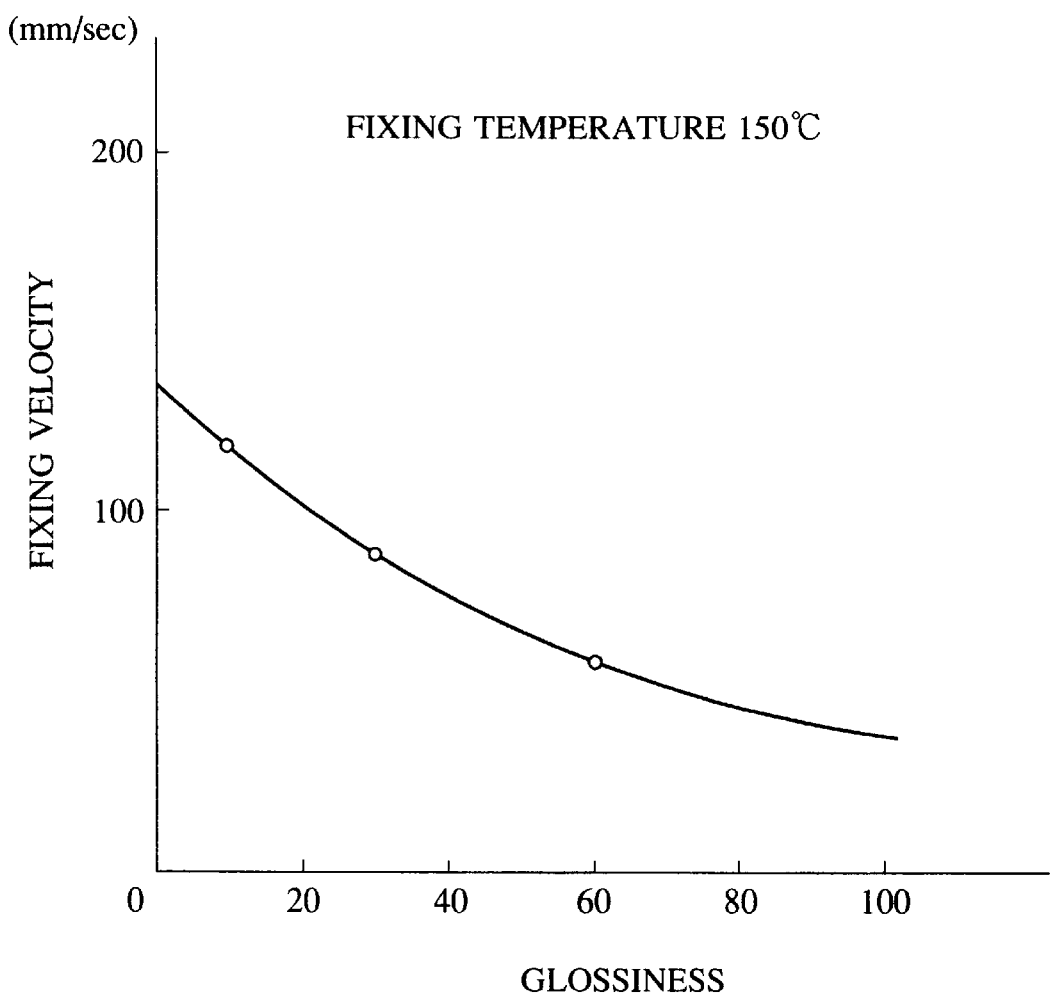
FIG. 6 illustrates the relationship between the level of glossiness and the fixing velocity.

The fixing velocity corresponding to the maximum glossiness of the image read from the document will now be explained with reference to FIG. 6. FIG. 6 is a diagram illustrating glossiness versus fixing velocity at a fixing temperature of 150° C. For example, the fixing velocity is controlled to be 90 mm/second when the maximum glossiness of the document image is approximately 30. In this manner, the glossiness of the document image is automatically detected from the document so as to control the velocity of the fixing means functioning as image forming means. With this arrangement, not only the density and color of the document image, but also the maximum glossiness of the image can be reproduced, thereby achieving highly-reproducible image formation.

Figure 7:
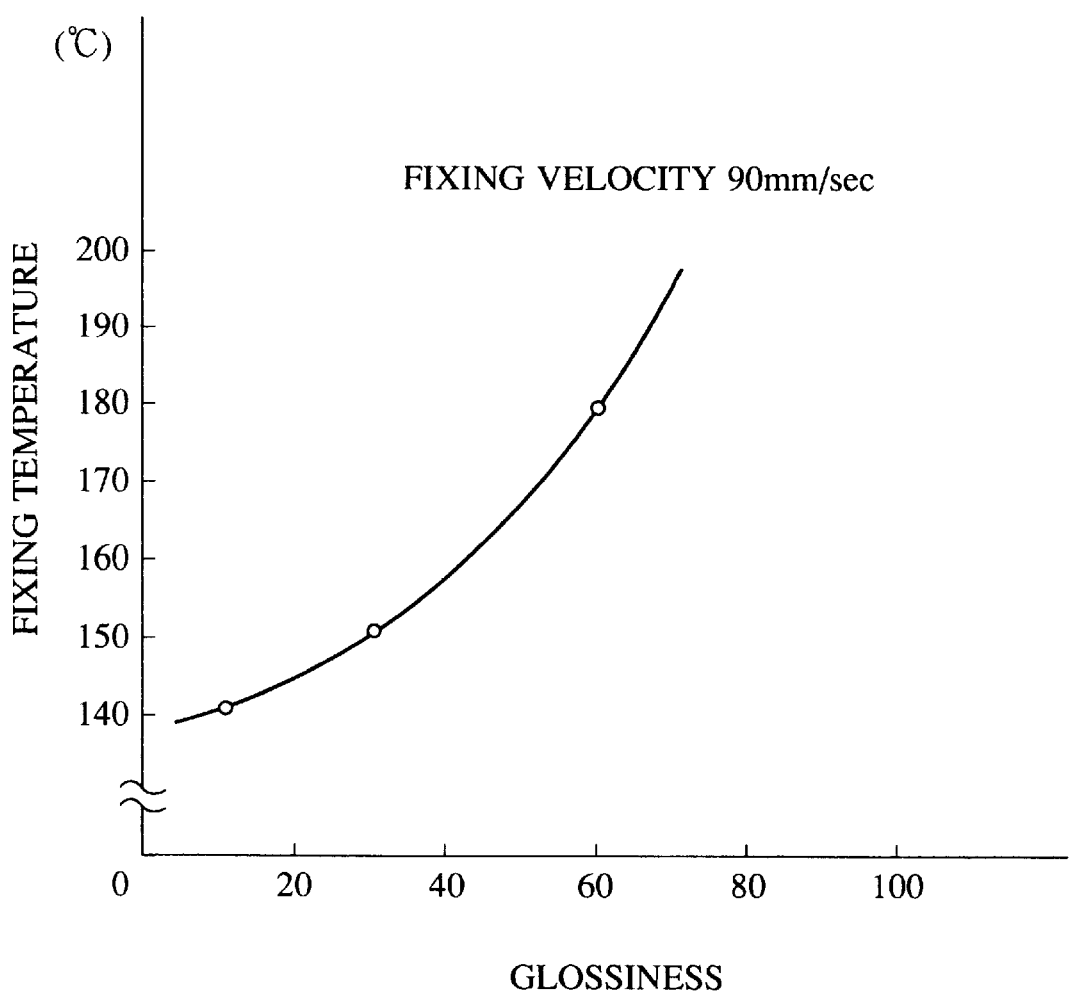
FIG. 7 illustrates the relationship between the level of glossiness and the fixing temperature.

Although in this embodiment the fixing velocity is varied as variable means for fixing conditions, the fixing temperature and the amount of oil to be applied to the fixing roller 29 may instead be varied as image forming means to be controlled. In both cases, similar advantages can be realized. The glossiness versus fixing temperature diagram obtained when the fixing temperature is varied is shown in FIG. 7 in which the fixing velocity is fixed at 90 mm/second. For example, when the maximum glossiness of the document image is approximately 60, the fixing temperature should be controlled at 180° C.

The glossiness of the fixed toner image is also changed according to the glossiness of the recording material used in the apparatus. The higher level of glossiness of the recording material slightly increases the glossiness of the toner image. Thus, further correction of the glossiness of the recording material will obtain more preferable results.

The selection of recording materials is effective in the use of the image forming apparatus according to an ink jet method utilizing a bubble jet or a piezoelectric device. The document reading system IV shown in FIG. 1 is used in the image forming apparatus as well as in the foregoing electrophotographic apparatus. In the manner discussed above, the maximum glossiness of the document image is computed by means of preliminary scanning.

In accordance with this maximum glossiness, the type of recording material used in this apparatus is selected so that the glossiness of the recording material is variable. The selection of recording materials may be performed, for example, as follows. A plurality of recording-material cassettes may be attachable to the apparatus main unit and store recording materials having different characteristics (degrees of glossiness) therein. Among these, the material best suited to the conditions may be chosen. Additionally, a recording material suitable for image formation, i.e., the type of recording material, may be displayed on an operational panel 60, whereby the user is able to change the recording material as required.

With the construction described above, the maximum glossiness of the document image can be expressed in the image forming apparatus utilizing the ink jet method as well as in the previously-discussed electrophotographic apparatus, thus enabling highly-reproducible image formation. This is because ink is used as an image visualizing material in this ink jet method, unlike the electrophotographic method in which the toner is used as the image visualizing material. Accordingly, the glossiness of the reproduced image is determined by the selection of recording materials, which makes it possible to reproduce the glossiness true to the document image.

A description will now be given of another embodiment of the present invention.

In this embodiment, an apparatus main unit 1, a document reading system IV, a fuser 18 and other elements similar to those employed in the previous embodiment are used, and a detailed explanation of the operation thereof will thus be omitted.

Figure 8:
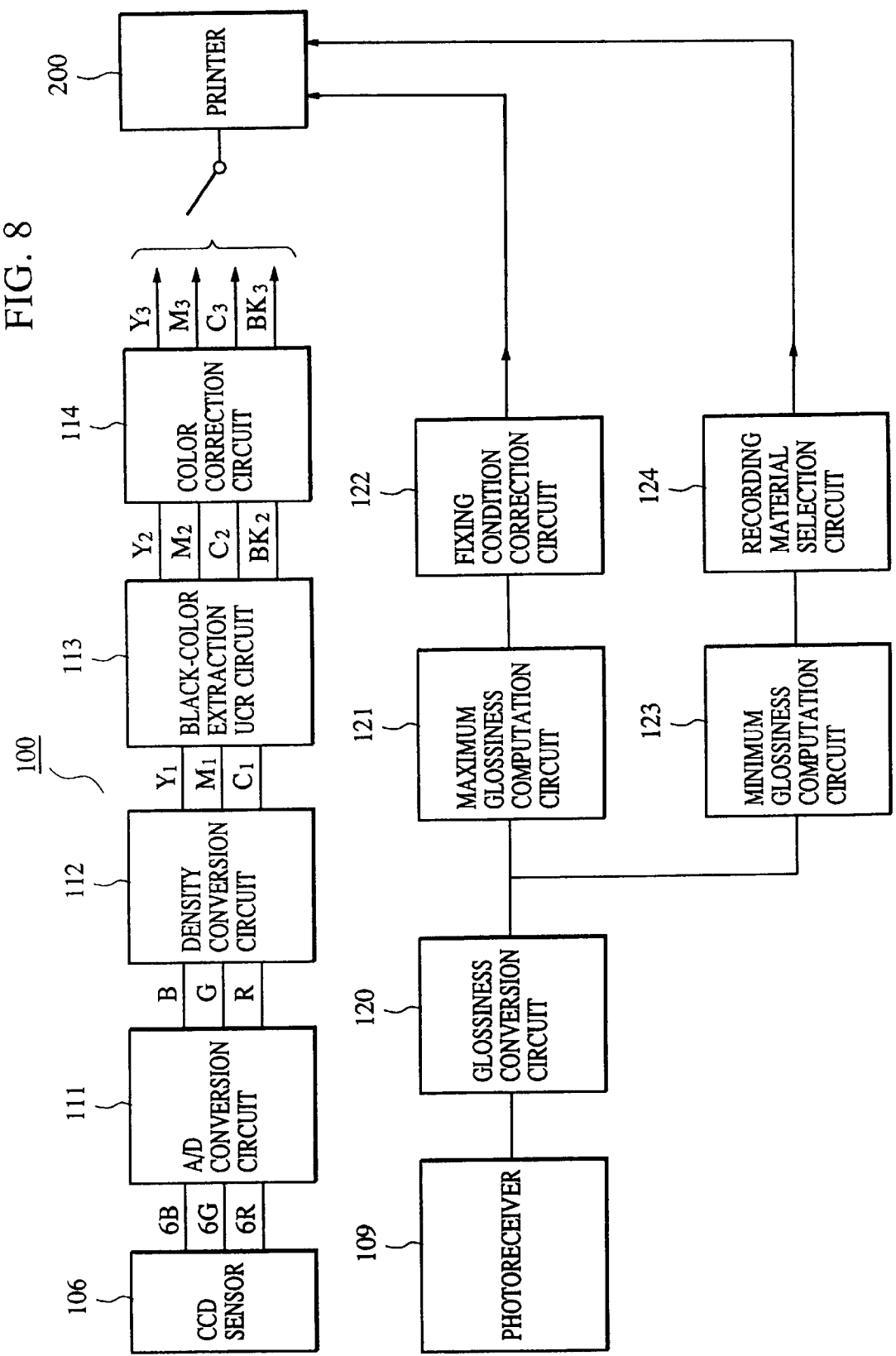
FIG. 8 is a block diagram of the document image information processing circuitry.

This embodiment differs from the previous embodiment in the following respect. As shown in a controller (processing circuit) 100 of FIG. 8, a minimum glossiness computation circuit 123 and a recording-material selection circuit 124 are added to the processing circuit 100 shown in FIG. 2, thereby further detecting the minimum glossiness of the document image. The minimum glossiness is computed and processed in the minimum glossiness computation circuit 123, and based on this value, the glossiness of the recording material is varied. This may be performed according to a method similar to that employed in the previous embodiment.

With this construction, not only the maximum glossiness of the document image, but also the minimum glossiness thereof, can be expressed, thereby accomplishing more highly-reproducible image formation. This can be achieved for the following reason. By use of toner as an image-visualizing material according to the electrophotographic method, the white portion without having toner transferred thereon, i.e., the recording material without having an image thereon, generally has the lowest level of glossiness. The minimum glossiness of the document image is thus determined to be the glossiness of the recording material, thereby realizing good reproducibility of the document image.

Figure 9:
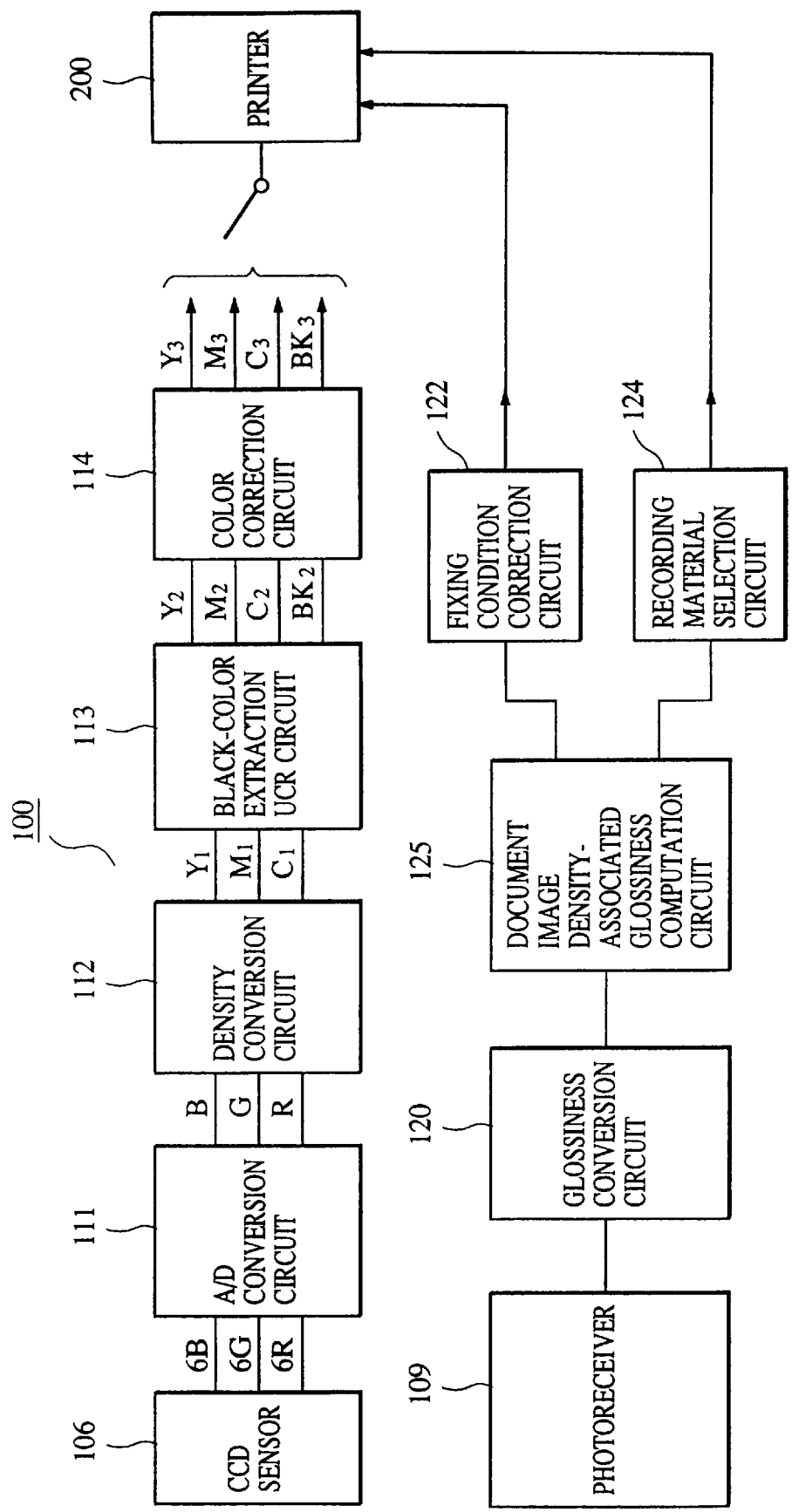
FIG. 9 is a block diagram of the document image information processing.
Figure 10:
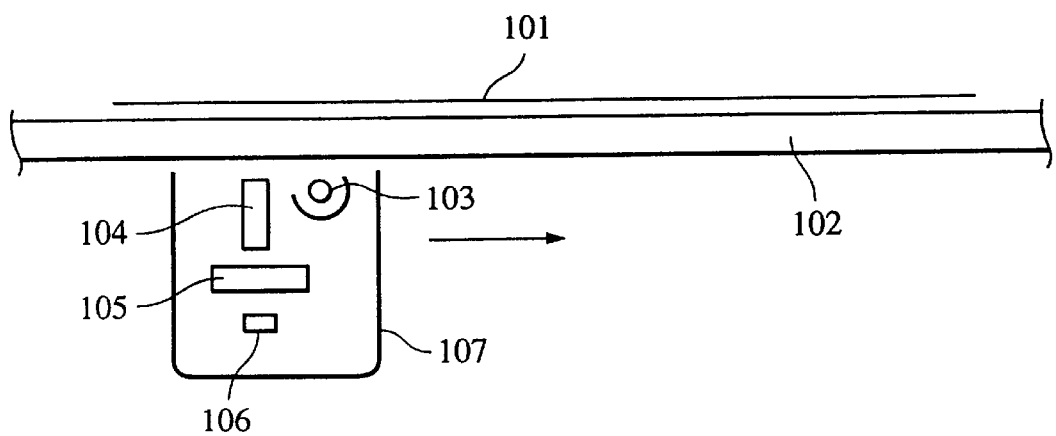
FIG. 10 is a sectional view of the construction of a conventional image reader.
Figure 11:
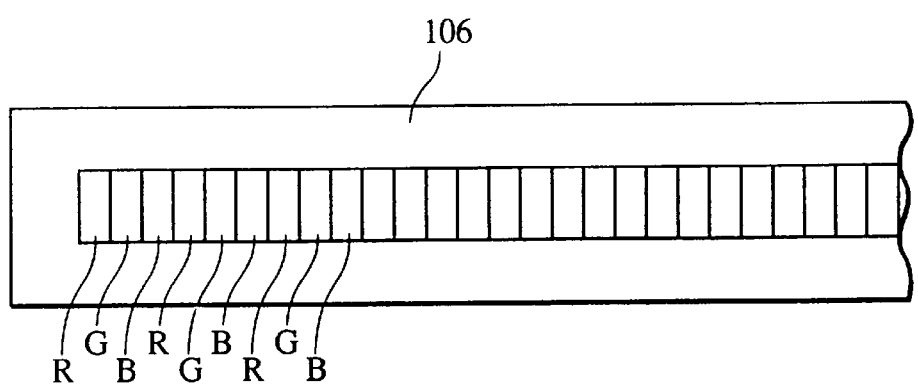
FIG. 11 illustrates the construction of a CCD.
Figure 12:
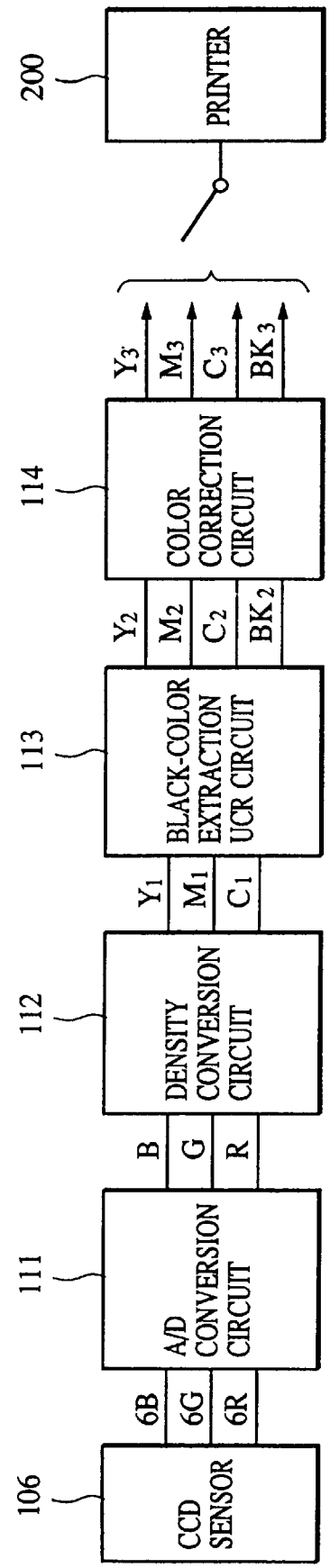
FIG. 12 is a block diagram of the conventional document image information processing circuitry.

This embodiment is simply constructed in such a manner that the maximum and minimum levels of glossiness of the document image are determined. As shown in the controller (processing circuit) 100 of FIG. 9, however, a computation circuit 125 for computing the level of glossiness corresponding to the density of a document image may further be provided so that the fixing conditions can be corrected according to the glossiness associated with the maximum density of the document image and that the glossiness, of the recording material is made variable in accordance with the glossiness corresponding to the minimum density of the image. This enables the further improved reproducibility of the glossiness faithful to the document image.

A description will further be given of another fuser by the application of the present invention.

Figure 13:
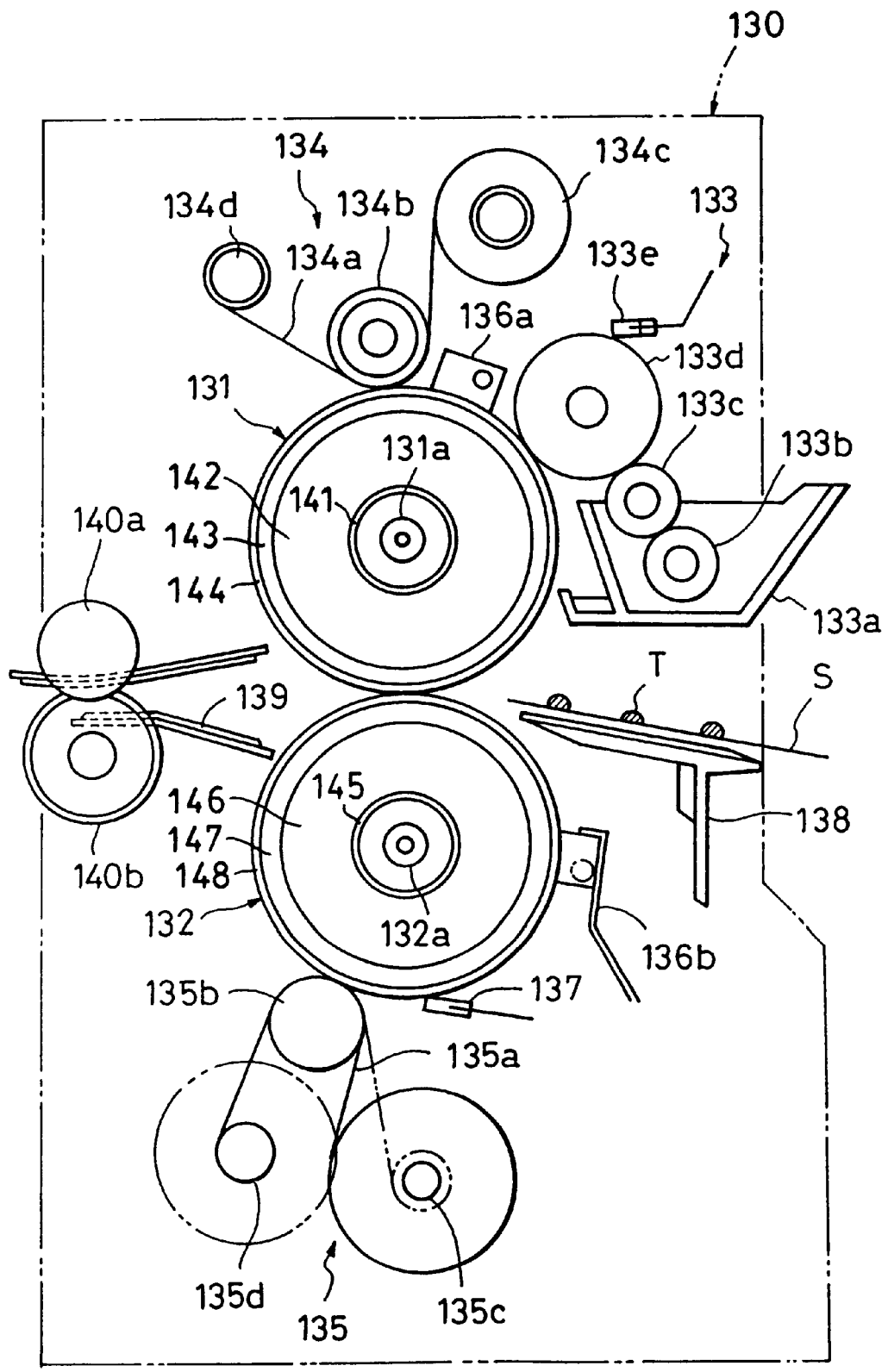
FIG. 13 is a sectional view of the construction of a fuser according to another embodiment of the present invention.

Referring to FIG. 13, a fuser generally denoted by 130 comprises a fixing roller 131 and a pressurizing roller 132. The fixing roller 131 has a halogen heater 131a serving as a heating source inside, while the pressurizing roller 132 includes a halogen heater 132a used as a heating source inside (may not be provided with the halogen heater 132a inside) and is rotatably pressure-welded to the fixing roller 131. The fuser 130 further includes an oil applying device 133 for applying silicone oil used as a releasing agent onto the fixing roller 131, and cleaning devices 134 and 135 for removing toner stained on the surfaces of the fixing roller 131 and the pressurizing roller 132.

Each of the fixing roller 131 and the pressurizing roller 132 comprises an internal layer 142, 146 formed of high-temperature vulcanized (HTV) silicone rubber disposed around an aluminum core metal 141, 145, an intermediate layer 143, 147 formed of fluororubber used for preventing the entry of oil into the internal layer, and an external layer 144, 148 located around the intermediate layer and formed of low-mentioned temperature vulcanized (LTV) or room temperature vulcanized (RTV) silicone rubber having good affinity with silicone oil used as the releasing agent. For ensuring good releasability, the external layers of the fixing roller 131 and the pressurizing roller 132 are preferably formed of the same material. Both rollers are also located to form a nip portion for feeding recording materials therebetween in a clamping manner in cooperation with each other.

Moreover, the heating operations of the respective halogen heaters 131a and 132a are controlled by temperature control means (not shown). More specifically, the temperature control means controls the on/off state of the halogen heaters 131a and 132a based on the surface temperatures of the fixing roller 131 and the pressurizing roller 132 detected by thermistors 136a and 136b, respectively.

Further, the oil applying device 133 can be attached to and separated from the fixing roller 131. The device 133 causes lifting rollers 133b and 133c to lift the silicone oil stored in an oil basin 133a toward an applying roller 133d, thereby applying the silicone oil to the surface of the fixing roller 131 by use of the applying roller 133d. It should be noted that the oil applying device 133 is attached to and separated from the fixing roller 131 under the control of the on/off operation of a solenoid (not shown). Also, the application of the silicone oil to the fixing roller 131 is controlled by a control blade 133e. In the apparatus shown in FIG. 13, oil in the amount of 0.08 g/A4 defined by the foregoing measurement method is applied. Pressurizing roller 132 is also provided with a control blade 137.

The cleaning devices 134 and 135 of the fuser 130 shown in FIG. 13 respectively comprise: cleaning webs 134a and 135a formed of heat-resistance non-woven Nomex (not shown) or nickel-plated Nomex obtained according to an electroless plating method; pressing rollers 134b and 135b for pressing the webs 134a and 135a against the fixing roller 131 and the pressurizing roller 132, respectively; supplying rollers 134c and 135c for unwinding the webs 134a and 135a, respectively; and take-up rollers 134d and 135d for sequentially winding the webs 134a and 135a, respectively.

In the apparatus described above, a recording material is conveyed to the fuser 130 and then passes between the fixing roller 131 and the pressurizing roller 132, both of which rotate at a constant velocity. Simultaneously, the recording material is pressurized and heated between the rollers 131 and 132 from the obverse and reverse sides thereof, whereby the unfixed toner carried on the recording material can be melted and fixed. During this fixing operation, the toner attached to the fixing roller 131 and the pressurizing roller 132 is cleaned by the cleaning devices 134 and 135.

In FIG. 13, S indicates a recording material; T designates toner; 138 and 139 denote guide members; and 140a and 140b represent recording-material discharging rollers. The fuser 130 illustrated in FIG. 13 is shown in the upstream and downstream directions opposite to the fuser 18 illustrated in FIG. 3.

An explanation will now be given of the image forming apparatus shown in FIG. 3 equipped with the above-described fuser 130 in place of the fuser 18 of FIG. 3. The recording-material discharging rollers 52 shown in FIG. 3 are also replaced by the rollers 140a and 140b illustrated in FIG. 13.

The apparatus shown in FIG. 3 is capable of forming images on both sides of a recording material. A mechanism of the double-sided image formation will be explained as follows.

The apparatus main unit 1 includes recording-material refeeding rollers 50 and a recording-material conveying passage 51, both of which constitute a feeding mechanism (double-sided printing mechanism) for performing the double-sided image formation. The recording-material refeeding rollers 50 are located below the recording-material discharging rollers 52 so as to re-convey a recording material that has been placed on the recording-material discharging tray 17 to the latent-image forming system II. The conveying passage 51 for conveying the recording material is positioned at the rear of the refeeding rollers 50.

A description will further be given of performing double-sided color image formation in the apparatus discussed above.

A recording material carrying on the obverse side (first side) an unfixed toner image that has been developed in the developer unit system III and formed according to a first image on the document is fed by the feeding belt 16, and the unfixed toner image is fixed between the fixing roller 131 and the pressurizing roller 132. Subsequently, the recording material passes between the discharge rollers 140a and 140b and supplied to the discharging tray 17. Thereafter, the material is fed by the refeeding rollers 50 and, through the conveying passage 51, once again supplied to the image forming system II in which an unfixed toner color image is formed on the reverse side (second side) according to a second image on the document in a manner similar to the obverse side. The recording material having the fixed color image on the obverse side and carrying the transferred unfixed color toner image on the reverse side is conveyed to the fixing roller 131 and the pressurizing roller 132 by the feeding belt 16, and the unfixed image is fixed therebetween. For performing the double-sided image formation, images formed on both sides of the document are first read individually or simultaneously in the foregoing preliminary scanning process.

Further, the levels of glossiness of the respective images on both sides of the document are obtained from the document reading system as described above. In this embodiment, the degrees of the maximum glossiness of the respective images on both sides are compared, and upon this comparison, the image having the greater degree of the maximum glossiness is fixed on the first side of the recording material. In addition, in order to reflect the fixing condition correction value obtained from the document reading system IV in the aforementioned fuser 130, the fixing velocity variable means is provided to change the fixing velocity based on this correction value while images are formed on the first and second sides.

Terms used throughout this specification will now be defined as follows.

"The high level of glossiness" is the value 50 or higher when measured with a commercially-available glossmeter (trade name Glosschecker IG-320, produced by Horiba Co.,Ltd.). For example, the glossiness of images, such as silver salt photographs, are included in this high level of glossiness region. "The intermediate level of glossiness" ranges from 20 to 50, represented by printed articles by way of example. "The low level of glossiness" is 20 or lower. Although the definition of the glossiness regions may vary from individual to individual, the examination revealed that most of the selected people grouped the glossiness regions as described above.

Also, "the higher velocity" through this specification is 100 mm/second or higher, typically represented by 130 mm/second. "The intermediate velocity" ranges from 50 to 100 mm/second, a typical example being 90 mm/second. "The lower velocity" is 50 mm/second or lower, typically represented by 30 mm/second. The definitions of these velocity regions are not exclusive and may significantly vary depending on the quality of toner and other fixing conditions.

When the double-sided copy button is pressed and the image to be formed on the first side has a high level glossiness (50 or higher), the fixing velocity on the first side is set to be low (for example, 30 mm/second). With this modification, the image fixed on the first side results in a high degree of glossiness (approximately 90), which is a substantially saturated value, thus producing very little influence on the conditions (velocity) for fixing the image on the second side. Accordingly, if the image to be formed on the second side, as well as the image on the first side, has a high level of glossiness (50 or higher), the fixing velocity on the second side is also set to be low (for example, 30 mm/second) so as to sufficiently heat the toner, resulting in a high degree of glossiness (approximately 75) provided for the image formed on the second side.

This will be explained in more detail with reference to FIG. 14(a). It should be noted that the data shown in FIG. 14(a) was obtained when the same image was fixed on the first and second sides and that a level of glossiness was measured when toner was fixed in the amount from 1.0 to 1.5 g/A4.

Figure 14A:
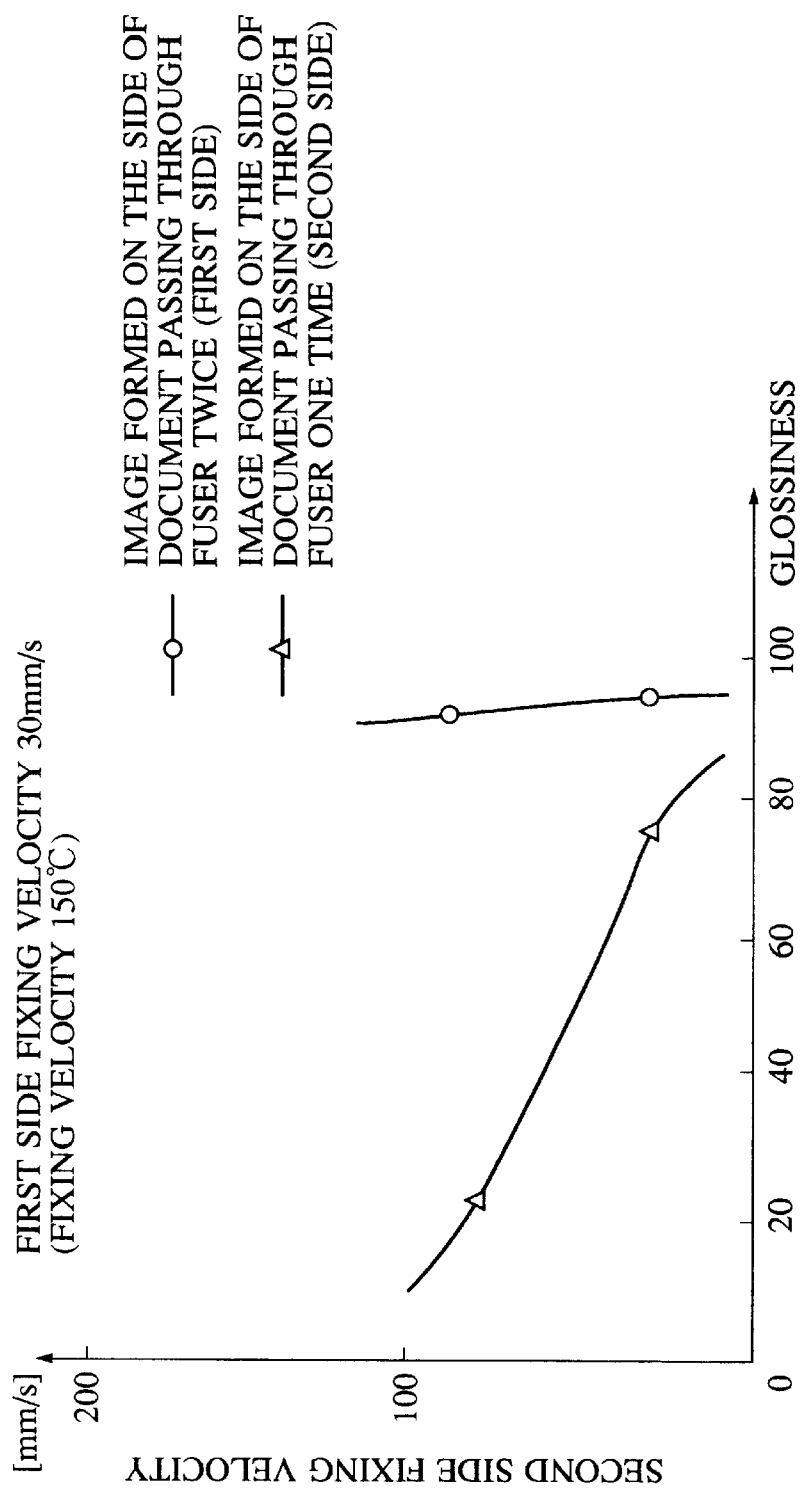

As is seen from FIG. 14(a), when the intermediate level of glossiness (ranging from 20 to 50) is desired on the second side, the fixing velocity should be adjusted to be intermediate. For instance, when the fixing velocity on the second side is set to be 60 mm/second, the first side results in a high degree of glossiness, approximately 90, while the second side obtains an intermediate degree of glossiness, approximately 40. On the other hand, if a the low degree of glossiness is desired on the second side, the fixing velocity should be set to be high, as is seen from FIG. 14(a). For example, when the fixing velocity on the second side is set to be 100 mm/second, the first side obtains a high level of glossiness, approximately 90, while a low degree of glossiness, approximately 10, is achieved on the second side. In this manner, when the selection is made such that an image having a higher level of glossiness will be formed on the first side, the following adjustments will be made to the fixing velocity by way of example. The fixing velocity on the first side is first set to be low. Then, the fixing velocity on the second side is changed according to the level of glossiness of the document image. This makes it possible to realize good reproducibility of glossiness, thereby achieving high quality of reproduced images from the aesthetic point of view.

Figure 15:
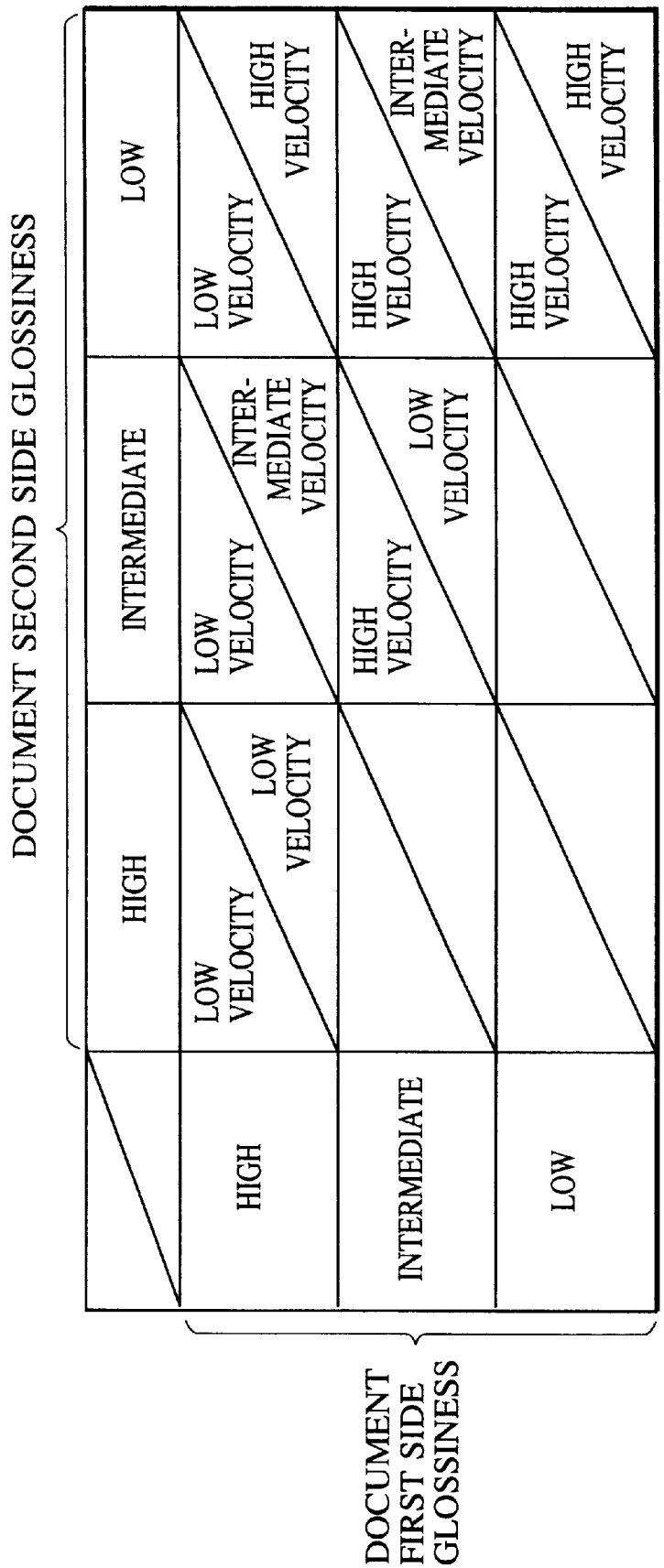
FIG. 15 is a chart that presents the appropriate fixing velocities for various combinations of glossiness.

The aforementioned results are summarized in FIG. 15 for easy understanding. FIG. 15 illustrates a combination of the degrees of fixing velocity provided for the first and second sides defined for reproducing the levels of glossiness of the first and second sides of the document. This combination has been determined on the precondition that the image formed on the document having the greater value of the maximum glossiness will be fixed on the first side of the recording material.

An explanation will now be given with reference to FIG. 15 of the case in which the image having an intermediate level of glossiness (from 20 to 50) is selected to be fixed on the first side of the recording material and the image having the intermediate degree of glossiness (from 20 to 50) or the lower level of glossiness (from 0 to 20) is chosen to be fixed on the second side.

When the image having an intermediate level of glossiness (from 20 to 50) is selected on the first side, the fixing velocity on the first side is set to be higher (for example, 130 mm/second) so that the image having a low level of glossiness can be formed on the first side. Then, if the image on the second side also has an intermediate degree of glossiness, the fixing velocity on the second side is set to be lower (50 mm/second), whereby heat can be transferred to both sides of the recording material. As a consequence, as is seen from FIG. 14(b), the levels of glossiness of the first and second sides result in 45 and 35, respectively, both of which are intermediate levels.

In contrast, if the image on the second side of the document has a lower level of glossiness, the fixing velocity of the first side is set to be higher (for instance, 130 mm/second), whereby a low level of glossiness can be obtained for the image fixed on the first side. For the fixing operation on the second side, the fixing velocity is set to be intermediate so that the heat can be transferred to both sides of the recording material to a certain extent. As shown in FIG. 14(b), for example, the degrees of fixing velocity on the first and second sides are set to be 130 mm/second and 90 mm/second, respectively, and as a result, the levels of glossiness of the first and second sides result in approximately 25 and 18, respectively.

Likewise, when the images exhibiting lower levels of glossiness are selected on both the first and second sides, the degrees of fixing velocity of both sides are set to be, for example, 130 mm/second, thus accomplishing the lower levels of glossiness on both sides (FIG. 15).

As clearly understood from the foregoing description, the present invention offers the following advantages. When the image on the document having the greater value of the maximum glossiness is formed on the first side, the levels of glossiness on both sides can be reproduced based on the above-described combination of levels of fixing velocity, thereby achieving the formation of the improved reproduced images from an aesthetic point of view.

Although in this embodiment the fixing velocity is made variable as fixing condition variable means, the fixing temperature may vary to increase or decrease the level of glossiness. In both cases, similar advantages can be realized.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image forming apparatus comprising:

image information obtaining means for obtaining information of an image on a document;

image forming means for forming an image on a recording material in accordance with the information obtained by said image information obtaining means;

glossiness detection means for detecting a level of glossiness of the image on the document; and control means for controlling said image forming means in accordance with the level of glossiness detected by said glossiness detection means; and wherein said image information obtaining means and said glossiness detection means scan the whole of the document substantially concurrently.

2. An image forming apparatus according to claim 1, wherein said glossiness detection means comprises a light source for applying light to the document, and a photoreceiving element for receiving the light reflected from the document, said photoreceiving element receiving the light regularly reflected from said light source.

3. An image forming apparatus according to claim 1, further comprising control means for controlling said image forming means based on the maximum glossiness obtained from said glossiness detection means.

4. An image forming apparatus according to claim 1, wherein said image forming means comprises means for forming an unfixed image on the recording material and fixing means for feeding at a velocity the recording material and fixing the unfixed image thereon; and further comprising control means for controlling the velocity of the recording material fed by said fixing means based on an output from said glossiness detection means.

5. An image forming apparatus according to claim 1, wherein said image forming means comprises means for forming an unfixed image on the recording material and fixing means for thermally fixing the unfixed image on the recording material, and further comprising control means for controlling the temperature of said fixing means based on an output from said glossiness detection means.

6. An image forming apparatus according to claim 1, wherein said image forming means comprises means for forming an unfixed image on the recording material and fixing means for fixing the unfixed image on the recording material, and further comprising releasing agent applying means for applying an amount of releasing agent to said fixing means, and control means for controlling the amount of the releasing agent applied by said releasing agent applying means based on an output from said glossiness detection means.

7. An image forming apparatus according to claim 1, wherein the image on the recording material formed by said image forming means is an ink image.

8. An image forming apparatus according to claim 1, wherein said image forming means comprises fixing means for fixing an unfixed image on a recording material in accordance with a first image on a document and then for fixing an unfixed image on the recording material in accordance with a second image on a document, wherein a level of glossiness of said first image detected by said glossiness detection means is higher than a level of glossiness of said second image.

9. An image forming apparatus according to claim 8, wherein the image formed in accordance with said first image on the document is formed on a first side of the recording material, and the image in accordance with said second image on the document is formed on a second side opposite to the first side.

10. An image forming apparatus according to claim 8, wherein said glossiness detection means generates one or more outputs based on the levels of glossiness of the first image on said document and the second image on said document, and further comprising control means for controlling said image forming means based on the outputs from said glossiness detection means.

11. An image forming apparatus according to claim 10, wherein the outputs of the glossiness detection means include an indicator of a maximum glossiness of each of the two images on the document.

12. An image forming apparatus according to claim 11, wherein the outputs of the glossiness detection means include an indicator of a minimum glossiness of each of the two images on the document.

13. An image forming apparatus according to claim 1, wherein said image information obtaining means and said glossiness detection means have different light sources respectively.

14. An image forming apparatus according to claim 1, further comprising a unit for moving along the document, wherein said unit has said image information obtaining means and said glossiness detection means.

15. An image forming apparatus comprising:

image forming means for forming an image on a recording material in accordance with an image on a document;

glossiness detection means for detecting from the document a level of glossiness of the image on the document;

input means for inputting recording materials of at least two different types, wherein said glossiness detection means generate one or more outputs based on the level of glossiness of the image on the document; and control means for controlling said image forming means, wherein said control means selects one of said types of recording material based on the output from said glossiness detection means.

16. An image forming apparatus according to claim 15, wherein said control means selects the type of recording material based on the minimum glossiness obtained from said glossiness detection means.

17. An image forming apparatus comprising:

image forming means for forming an image on a recording material in accordance with an image on a document;

glossiness detection means for detecting from the document a level of glossiness of the image on the document; and a display unit for displaying the type of recording material which is determined from an output from said glossiness detection means.

18. An image forming apparatus according to claim 17, wherein said image forming means comprises means for forming an unfixed image on the recording material and fixing means for feeding the recording material at a velocity and fixing the unfixed image thereon, and further comprising control means for controlling the velocity of the recording material fed by said fixing means based on an output from said glossiness detection means.

19. An image forming apparatus according to claim 17, wherein said image forming means comprises means for forming an unfixed image on the recording material and fixing means for thermally fixing the unfixed image on the recording material, and further comprising control means for controlling the temperature of said fixing means based on an output from said glossiness detection means.

20. An image forming apparatus according to claim 17, wherein said image forming means comprises means for forming an unfixed image on the recording material and fixing means for fixing the unfixed image on the recording material, and further comprising releasing agent applying means for applying an amount of releasing agent to said fixing means, and control means for controlling the amount of releasing agent applied by said releasing agent applying means based on an output from said glossiness detection means.

21. An image forming apparatus according to claim 17, wherein the image on the recording material formed by said image forming means is an ink image.

22. An image forming apparatus comprising:

unfixed-image forming means for forming an unfixed image on a recording material;

fixing means for fixing the unfixed image onto the recording material by conveying the recording material;

selecting means for selecting a mode from a plurality of modes among which is (i) a first mode for forming a glossy image at first on a first side of the recording material and then forming a glossy image on a second side of the recording material, which is the back side of the first side of the recording material, and (ii) a second mode for forming an image, of which the level of glossiness is lower than the level of glossiness of the image formed in the first mode, on both sides of the recording material; and controlling means for controlling said fixing means such that, when the first mode is selected, a conveying speed of said fixing means is higher when the unfixed image is on the first side of the recording material than when the unfixed image is on the second side of the recording material.

23. An image forming apparatus according to claim 22, wherein said controlling means controls the conveying speed of said fixing means such that the level of the glossiness of the image formed on the first side of the recording material becomes equal to the level of the glossiness of the image formed on the second side of the recording material.

* * * * *

UNITED STATES PATENT AND TRADEMARK OFFICE
CERTIFICATE OF CORRECTION

PATENT NO. : 6,088,546

DATED : July 11, 2000

INVENTOR(S): MASAHIRO INOUE, ET AL.

It is certified that error appears in the above-identified patent and that said Letters Patent is hereby corrected as shown below:

COLUMN 2:
Line 8, "all" should read --$a_{11}$--; and
Line 19, "the" should be deleted.
COLUMN 7:
Line 44, "$T_1$." should read --$T_1$"--; and
Line 45, "$T_1$." should read --$T_1$"--.
COLUMN 8:
Line 61, "coming contact" should read --coming into contact--.
COLUMN 10:
Line 40, "glossiness" should read --glossiness,--; and
Line 62, "low-mentioned" should read --low-temperature--.

Signed and Sealed this

Seventeenth Day of April, 2001

Attest:

NICHOLAS P. GODICI

Attesting Officer

Acting Director of the United States Patent and Trademark Office